(12) United States Patent
Li

(10) Patent No.: US 8,819,597 B2
(45) Date of Patent: Aug. 26, 2014

(54) GLYPH ENTRY ON COMPUTING DEVICE

(75) Inventor: Yang Li, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 199 days.

(21) Appl. No.: 12/422,185

(22) Filed: Apr. 10, 2009

(65) Prior Publication Data

US 2010/0262905 A1    Oct. 14, 2010

(51) Int. Cl.
*G06F 17/00* (2006.01)
*G06F 3/00* (2006.01)
*G06F 3/048* (2013.01)

(52) U.S. Cl.
USPC ........... 715/863; 715/263; 715/784; 715/810; 715/830

(58) Field of Classification Search
CPC ........................... G06F 3/04883; G06F 3/0482
USPC ................. 715/702, 863, 864, 784, 830, 268; 382/187
See application file for complete search history.

(56) References Cited

U.S. PATENT DOCUMENTS

| | | | | |
|---|---|---|---|---|
| 4,972,496 A * | 11/1990 | Sklarew | ........................ | 382/187 |
| 4,988,981 A | 1/1991 | Zimmerman et al. | | |
| 5,252,951 A | 10/1993 | Tannenbaum et al. | | |
| 5,500,937 A * | 3/1996 | Thompson-Rohrlich | ..... | 715/764 |
| 5,734,882 A * | 3/1998 | Lopresti et al. | ................ | 345/179 |
| 5,864,635 A * | 1/1999 | Zetts et al. | ..................... | 382/187 |
| 5,923,793 A * | 7/1999 | Ikebata | ........................ | 382/311 |
| 6,057,845 A | 5/2000 | Dupouy | | |
| 6,407,679 B1 * | 6/2002 | Evans et al. | ...................... | 341/20 |
| 6,493,464 B1 * | 12/2002 | Hawkins et al. | .............. | 382/189 |
| 6,573,883 B1 | 6/2003 | Bartlett | | |
| 6,791,537 B1 * | 9/2004 | Shim et al. | ..................... | 345/173 |
| 7,002,560 B2 * | 2/2006 | Graham | ........................ | 345/179 |
| 7,004,394 B2 * | 2/2006 | Kim | ........................ | 235/472.01 |
| 7,372,993 B2 * | 5/2008 | Lagardere et al. | ............ | 382/186 |
| 7,786,975 B2 * | 8/2010 | Ording et al. | .................. | 345/156 |
| 2003/0214540 A1 | 11/2003 | Huapaya et al. | | |
| 2004/0145574 A1 * | 7/2004 | Xin et al. | ...................... | 345/173 |
| 2005/0022130 A1 * | 1/2005 | Fabritius | ....................... | 715/739 |
| 2005/0111736 A1 * | 5/2005 | Hullender et al. | ............ | 382/188 |
| 2006/0233464 A1 * | 10/2006 | Simmons | ...................... | 382/321 |
| 2006/0288313 A1 * | 12/2006 | Hillis | ............................ | 715/863 |
| 2007/0146337 A1 | 6/2007 | Ording et al. | | |
| 2007/0177803 A1 | 8/2007 | Elias et al. | | |
| 2007/0273674 A1 | 11/2007 | Cohen et al. | | |
| 2008/0120576 A1 * | 5/2008 | Kariathungal et al. | ....... | 715/863 |
| 2008/0137971 A1 | 6/2008 | King et al. | | |
| 2008/0235621 A1 * | 9/2008 | Boillot | .......................... | 715/810 |
| 2009/0003658 A1 * | 1/2009 | Zhang et al. | .................. | 382/113 |
| 2009/0040215 A1 | 2/2009 | Afzulpurkar et al. | | |

OTHER PUBLICATIONS

"Symbol Commander" Retrieved from the Internet: http://web.archive.org/web/20041106050200/www.sensiva.com/symbolcommander/index.html (Nov. 2004) (2 pages).

(Continued)

*Primary Examiner* — Nicholas Ulrich
(74) *Attorney, Agent, or Firm* — Fish & Richardson P.C.

(57) ABSTRACT

A computer-implemented user interface method is disclosed. The method includes displaying on a touchscreen of a computing device a first sub-portion of a list of items, receiving from a user of the device an drawn input on the touchscreen, correlating the drawn input to an alphanumeric character, and automatically displaying a second sub-portion of the list having one or more entries whose first character correlates to the alphanumeric character.

20 Claims, 11 Drawing Sheets

(56) References Cited

OTHER PUBLICATIONS

Appert, Caroline and Shumin Zhai. "Using strokes as command shorcuts: cognitive benefits and toolkit support." ACM 2009; Boston, Massachusetts.

Fast Company. "Samsung Shows One Future for Touchscreen Cellphones: Alphabet Gestures." [retrieved on Apr. 10, 2009] Retrieved from the Internet: <URL:http://www.fastcompnay.com/blog/kit-eaton/technomiz/samsung-shows-one-furture-touchsreen-cellphones-alphabet-gestures>.

Geissler, Jorg. "Gedrics: The Next Generation of Icons." German National Research Center for Computer Science (CMD), 1995.

Monson-Haefel, Richard. "Multitouch++: One Finger Gestures." Feb. 2, 2009 [retrieved Apr. 10, 2009] Retrieved from the Internet: <URL:http://theclevermonkey.blogspot.com/2009/02/one-finger-gestures.html>.

Wobbrock, Jacob O. Meredith Ringle Morris, and Andrew D. Wilson. "User-Defined Gestures for Surface Computing." ACM 2009; Boston Massachusetts.

"Handbook for the Palm Zire 71 Handheld" [online] Retrieved from the Internet: URL:http://www.palm.com/us/support/handbooks/zire71/zire71_hb_ENG.pdf [retrieved on Mar. 20, 2007](Jan. 1, 2003) 261 pages.

European Examiner Alexandra Urlichs, International Search Report and Written Opinion for Application No.: PCT/US2010/030417, dated Jul. 23, 2010, 11 pages.

Examiner Nora Lindner, International Preliminary Report on Patentability for Application No. PCT/US2010/030417, dated Oct. 11, 2011, 6 pages.

Gross, Mark D. And Ellen Yi-Luen Do. "Drawing on the Back of an Envelope: A framework for interacting with application programs by freehand drawing." Computers & Graphics 24 (2000): 835-49 (15 pages).

Mexican Office Action in Mexican Application No. MX/a/2011/010676, dated Aug. 30, 2013, 7 pages.

Chinese Office Action in Chinese Application No. 201080024993.6, issued on Apr. 3, 2013, 14 pages (with English translation).

Chinese Office Action in Chinese Application No. 201080024993.6, issued on Jan. 24, 2014, 16 pages (with English translation).

\* cited by examiner

GLYPH ENTRY ON COMPUTING DEVICE

TECHNICAL FIELD

This document relates to systems and techniques for interacting with a user who enters glyphs, or drawn symbols such as alphabetic characters, on a display of a computing device.

BACKGROUND

People spends hours at a time with their electronic devices—computers, telephones, music players, and the like. They like best those devices that are intuitive to use and whose interactions best meet their expectations regarding how machines should work. They interact with electronics through inputs and outputs from the devices, where the outputs generally are provided audibly and/or on a flat graphical display screen, and the inputs may occur via touch screens, joysticks, mice, 4-directional keypads, and other such input mechanisms.

As mobile devices become more powerful, users interact with them more using graphical objects, such as lists of items, maps, images, and the like. The information represented by such objects may be enormous in terms of data represented, and visually very large (a detailed map of the United States would be miles wide), while the displays on mobile devices are very small. As a result, it can be a challenge to provide graphical information in sufficient detail for a user (e.g., by zooming in on one area of an object) while still giving the user a sense of space and permitting the user to move intuitively throughout the space.

SUMMARY

This document describes systems and techniques that may be used to interact with a user of a computing device like a mobile telephone having a touch screen user interface. In general, the techniques may react to user input of a glyph on a display, by moving the user to a object stored in the computing devices system that has been associated with the glyph. A glyph is a visual writing element that a user can enter, such as by dragging their finger on a touchscreen, generally in a single traced motion without lifting their finger. Glyphs can include alphanumeric characters and other symbols.

For example, a user who is looking at a long list of items such as a list of songs in a playlist, may draw a letter of the alphabet on the display to have the list scrolled automatically to entries that start with that letter. In a similar manner, a user who is zoomed in on a portion of a map may trace a letter onto the screen of their device to pan to the nearest landmark that starts with that letter. Or a user looking at a virtual view of a street may trace the letter "E" on the screen to have their avatar face East.

A user may also be permitted to assign one or more custom glyphs to particular objects on a computer system. For example, a user may open a contacts entry for a friend and may select a control for submitting a glyph. The user may then trace any glyph that he or she prefers (e.g., the first letter of the friend's nickname or a simple shape) to have that glyph assigned to the friend's contact record. If the user enters the glyph later while using the device, the user will be taken straight to the contact record. Multiple glyphs may also be assigned to the same object so that the user has multiple ways to get to such an object.

A single glyph can also be assigned to multiple objects. In such a situation, upon entry of the glyph by a user, a pop up control may list the multiple objects and the user may select one of them. Alternatively, the proper object may be selected automatically by the system based on the context in which the glyph was entered. For example, if the glyph is entered when an address book application is active, the device will jump to a contact entry corresponding to the glyph rather than a music playlist corresponding to the glyph. Where the context could refer to multiple objects (e.g., if the glyph is entered on a desktop), the objects may be prioritized according to the object that is most likely to be selected (e.g., because it is frequently accessed by the user of the device, or because it is a type of object that is generally accessed more than another type of object).

In certain implementations, such systems and technique may provide one or more advantages. For example, a user of a computing device can navigate through a list quickly by jumping to a letter in the list that they have drawn on a touchscreen. Similarly, a user can navigate to an object in a two or three-dimensional space that does not fit on a single screen by entering a letter for the object on the screen and over a graphical depiction in which the object is located. Moreover, a user can customize their computing device to their own needs, and can jump to an object in a wholly different type of application than is currently present, by drawing a custom glyph on the display. In these ways, a user experience can be improved and a user can be made more efficient in their use of a device.

In one implementation, a computer-implemented user interface method is disclosed. The method comprises displaying on a touchscreen of a computing device a first sub-portion of a list of items, receiving from a user of the device an drawn input on the touchscreen, correlating the drawn input to an alphanumeric character, and automatically displaying a second sub-portion of the list having one or more entries whose first character correlates to the alphanumeric character. The method can also comprise distinguishing a scrolling input for the list from an entry of an alphanumeric character. The distinguishing of the scrolling input from the entry of the alphanumeric character can comprise identifying a bounding box for an entry of a portion of the alphanumeric character. Also, receiving the drawn input on the touchscreen can comprise receiving the drawn input on top of the sub-portion of the list of items.

In certain aspects, the list of items comprises an alphabetical list of items, and displaying the second sub-portion of the list comprises displaying a first alphabetical entry starting with the first character at a top edge of a display area in which the list is displayed. Also, the method can include providing to the user a visual or audible failure indicator if the drawn input is not recognized as an alphanumeric character. The failure indicator can comprise displaying the drawn input in a color that contrasts with a color in which the drawn input was previously displayed. In addition, the drawn input can be defined by a pointer contact with the touchscreen followed by a pointer release from the touchscreen, and a pointer path traced on the touchscreen between the pointer contact and the pointer release. The method can also include, before displaying the first sub-portion of the list of items, receiving from the user a tracing of a glyph on the touchscreen, determining that the received glyph corresponds to the list of items, and displaying the first subportion of the list of items in response to receipt of the glyph.

In another implementation, a computer-implemented user interface method is disclosed that comprises displaying on a touchscreen of a computing device content from an operating system or application operating on the device; receiving from a user of the device an drawn input on the touchscreen over the content from the operating system or application, wherein the drawn input is not correlated to the content from the operating system or application; identifying a user-defined glyph associated with the drawn input; and automatically displaying on the touchscreen, in response to identifying the user-defined glyph, one or more user-defined interface elements that corresponds to the user-defined glyph. Displaying the one or more user-defined interface elements can comprise launching an application associated with the user-defined glyph. The method can also include identifying a plurality of results corresponding to the user-defined glyph, and requesting the user to select one of the plurality of results, wherein the selected result generates the one or more user-defined interface elements.

In yet another implementation, an article is disclosed that comprises a computer-readable data storage medium storing program code operable to cause one or more machines to perform operations. The operations comprise displaying on a touchscreen of a computing device a first sub-portion of a list of items, receiving from a user of the device an drawn input on the touchscreen, correlating the drawn input to an alphanumeric character, and automatically displaying a second sub-portion of the list having one or more entries whose first character correlates to the alphanumeric character. The operations may further comprise distinguishing a scrolling input for the list from an entry of an alphanumeric character. Also, the list of items can comprise an alphabetical list of items, and displaying the second sub-portion of the list comprises displaying a first alphabetical entry starting with the first character at a top edge of a display area in which the list is displayed. The drawn input can also be defined by a pointer contact with the touchscreen followed by a pointer release from the touchscreen, and a pointer path traced on the touchscreen between the pointer contact and the pointer release.

In certain aspects, the operations further comprise, before displaying the first sub-portion of the list of items, receiving from the user a tracing of a glyph on the touchscreen, determining that the received glyph corresponds to the list of items, and displaying the first subportion of the list of items in response to receipt of the glyph.

In another implementation, a computer-implemented user interface system is disclosed that includes a graphical display to present portions of a graphical user interface showing objects designated by alphanumeric titles, a glyph interpreter to receive user traces on the graphical display and to identify a glyph corresponding to a received user trace, and a drawn user input controller programmed to display new content on the graphical display that has been previously identified as corresponding to the identified glyph. The objects designated by alphanumeric titles can be part of a sorted list of objects, and new content can comprise one or more entries in the list that begin with a character that matches the identified glyph. Also, the drawn user input controller can be programmed to distinguish a scrolling input from a user drawing input, and to identify a glyph only if the input is determined to be a user drawing input. It may also be programmed to receive a drawn glyph from a user and to cause a correlation to be formed between the drawn glyph and an object identified by the user so that future user entry of the drawn glyph causes the object identified by the user to be addressed by the system. It may further be programmed to identify drawn input that is received over an active application, without a visible input area, on the graphical display.

In another implementation, a computer-implemented user interface system comprises a graphical display to present portions of a graphical user interface showing objects designated by alphanumeric titles, a glyph interpreter to receive user traces on the graphical display and to identify a glyph corresponding to a received user trace, and means for displaying one of the objects in response to reception of a glyph on the graphical display, wherein the displayed object is correlated with the identified glyph.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques by which mobile devices may interact with a user of such devices. Such interaction may occur by a mobile device responding to user entries of simple characters, or glyphs, that in many instances may be in the form of Roman/Latin alphabet characters. For example, a user can jump to a location in an alphabetically-sorted list such as a music playlist, by tracing a letter on a display screen over the displayed playlist, so that the display will jump to the first entry in the list that starts with the character entered by the user.

The user may additionally be permitted to assign his or her own glyphs to various different objects in an operating system or applications running in an operating system. For example, a user may navigate to an object, such as a contact, a song, another type of media file, or other similar object. The user may select a control associated with the object to indicate an intent to assign a glyph to the object, and may then be instructed to draw the glyph on the display of the computing device. The glyph may appear as they draw it so that they can confirm that they want the glyph they have drawn to be assigned (or they can choose to redraw the glyph). When the user is later using the device, they may draw the glyph that they have created in order to jump to the object. In certain circumstances, the glyph can be drawn in any location on the device and may be resolved to the object, while in others, the glyph may be resolved only if the device is in a certain context (e.g., a glyph for a location in a particular application may be available only while the application is active).

Figure 1:
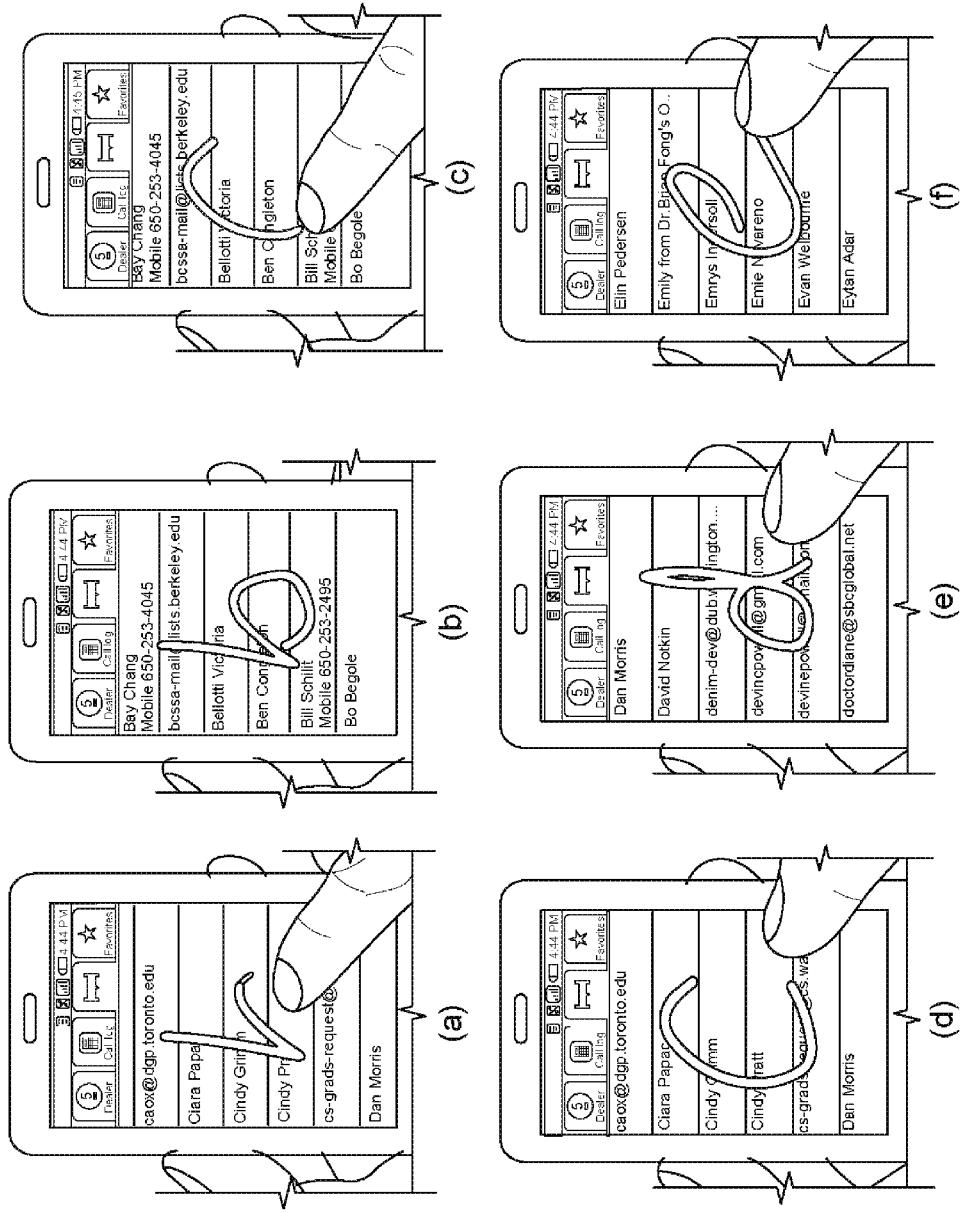
FIG. 1 shows a series of screenshots of a mobile touchscreen device scrolling to a location in a list corresponding to a user-entered character.

FIG. 1 shows a series of screenshots of a mobile touchscreen device scrolling to a location in a list corresponding to a user-entered character. In general, the screenshots are of displays of a mobile computing device in the form of a mobile smart phone and a user entering various alphabetic glyphs onto a the touchscreen of the device. Each of the six screenshot shows a different display during a sequence of user inputs.

The display designated by letter (a) shows a user looking at a contact list on his device. The contact list is sorted alphabetically, and, at the beginning of the action, is parked on names beginning with the letter "C." As can be seen, the user is in the process of tracing a lower base "b" on the screen, and the character is being mimicked on the display as the user traces. At the display designated by the letter (b), the user has finished tracing the letter, and one can see that the list of names has jumped automatically to names beginning with the letter "B", corresponding to the letter traced by the user, with the first alphabetical B name at the top of the list. Thus, the device has recognized that the user's traced glyph matched a representation of the alphabetical "b", and caused the display to jump to that location in the list.

At the display designated by the letter (c), the user has decided that they would like to see entries that begin with the letter "C", and thus they have begun tracing that letter onto the screen of the device. As can be shown, the display repeats their entry as they enter it, and at the display indicated by the letter (d), the letter "C" has been completed as the user lists his finger from the touchscreen surface. At that point, the device determines that the user's entry is complete and interprets the largely circular, though open, entry as the letter "C", and immediately and automatically scrolls the list to the entries that begin with the letter "C."

The user continues his entries at the displays marked by the letters (e) and (f), entering the alphabetic characters "d" and "e", respectively. At each entry, the list scrolls to the entries that start with the character that the user has entered.

As shown, the user entry occurs right over the display area where the application that displays the list is providing the displayed components. As such, the entry of glyphs may need to be distinguished from other data entry that may occur in the same area. As such, the device may need to recognize a user's intent to enter a glyph before moving forward with recognizing the glyph itself.

The manner of recognizing and identifying the glyph that is intended by a particular user tracing may be implemented using a variety of different mechanisms, including the $1 Recognizer and other recognizers and classifiers mentioned in Wobbrock et al., "Gestures without Libraries, Toolkits or Training: $1 Recognizer for User Interface Prototypes," UIST'07, Oct. 7-10, 2007, Newport, R.I., USA (ACM 978-1-59593-679-2/07/0010). The particular mechanism for recognizing the entered glyph is not critical to the manner in which the glyph is used herein, as long as the recognizer provides adequate accuracy.

Entry of a character on a long list may need to be distinguished from user entries that are intended to cause the list to scroll. Such distinctions may be made in a variety of manners. For example, a bounding box may be constructed around any initial vertical input (where the list scrolls vertically) or a portion of the initial vertical input, and the aspect ratio of the bounding box may be used to infer the user's intent—where a wider bounding box would indicate an intent to enter a glyph rather than to scroll. The bounding box may, but need not be, orthogonal to the edges of the screen on which the entry occurred. Because the technique uses the minimum bounding box of a motion, it can effectively separate scrolling from glyph drawing. For example, a scrolling motion might not be entirely vertical—many are in fact diagonal or slightly diagonal. Or a user may scroll a list up and down without lifting the finger, which causes a zig-zag motion. All these will still result in a "narrow" bounding box, i.e., a low aspect ratio in this context.

The bounding box might also be checked only if the initial stroke exceeds a predetermined minimum length, where it is assumed that very short user movements would not indicate the intent to enter a character because they would be too small in relation to the canvas presented to a user by a touchscreen.

Also, the speed of the original dragging motion may be considered, where a fast flick would indicate an intent to scroll, whereas a slower entry would indicate a more deliberate intent to enter a glyph. Other speed data or combinations of speed data may also be used. For example, a very slow vertical motion may indicate an intent to scroll a very small amount in a list, whereas a very fast movement may indicate an intent to flick the list, while a middle range of speeds may indicate an intent to enter a glyph. Also, if a system is program with no glyphs that have vertical elements, any vertical input can immediately be assumed to indicate an intent to scroll. The scrolling may also be suppressed while an initial determination is made of whether the input is intended to be a glyph entry or a scrolling entry, or may begin and may continue during the entry of the glyph, and then the device can jump, as part of the scrolling, to the part of the list represented by the character that corresponds to the entered glyph, once the glyph entry is completed by the user.

Also, the entered character may be recognized while it is being entered, or only after its entry is complete. The latter recognition may be triggered by a "pointer up" event on the touchscreen, while the former may involve continually providing tracing information to a recognizer as the glyph is being entered, and comparing the entered data to a set of possible solutions until all but one solution have been ruled out. At that point, the recognition may be made, even if the user has not yet completed his or her entry. The display of a line that follows the tracing of the user's finger may be dimmed initially, while the device is determining whether the entry is of a glyph or is for scrolling, and may be made brighter, thicker, and/or a different color once a determination is made that the user's intent is to enter a glyph.

A determination of user intent may also include determining a level of pressure applied by the user, either apart from, or in combination with, other determinations such as an angle of a beginning vertical stroke and the speed of the stroke. For example, a very light and fast user entry may indicate a flick, and an intent to scroll quickly. Higher pressure may indicate more deliberate entry, in that the user is trying to trace out a character or other glyph and thus intends to draw an input rather than to scroll.

Figure 2:
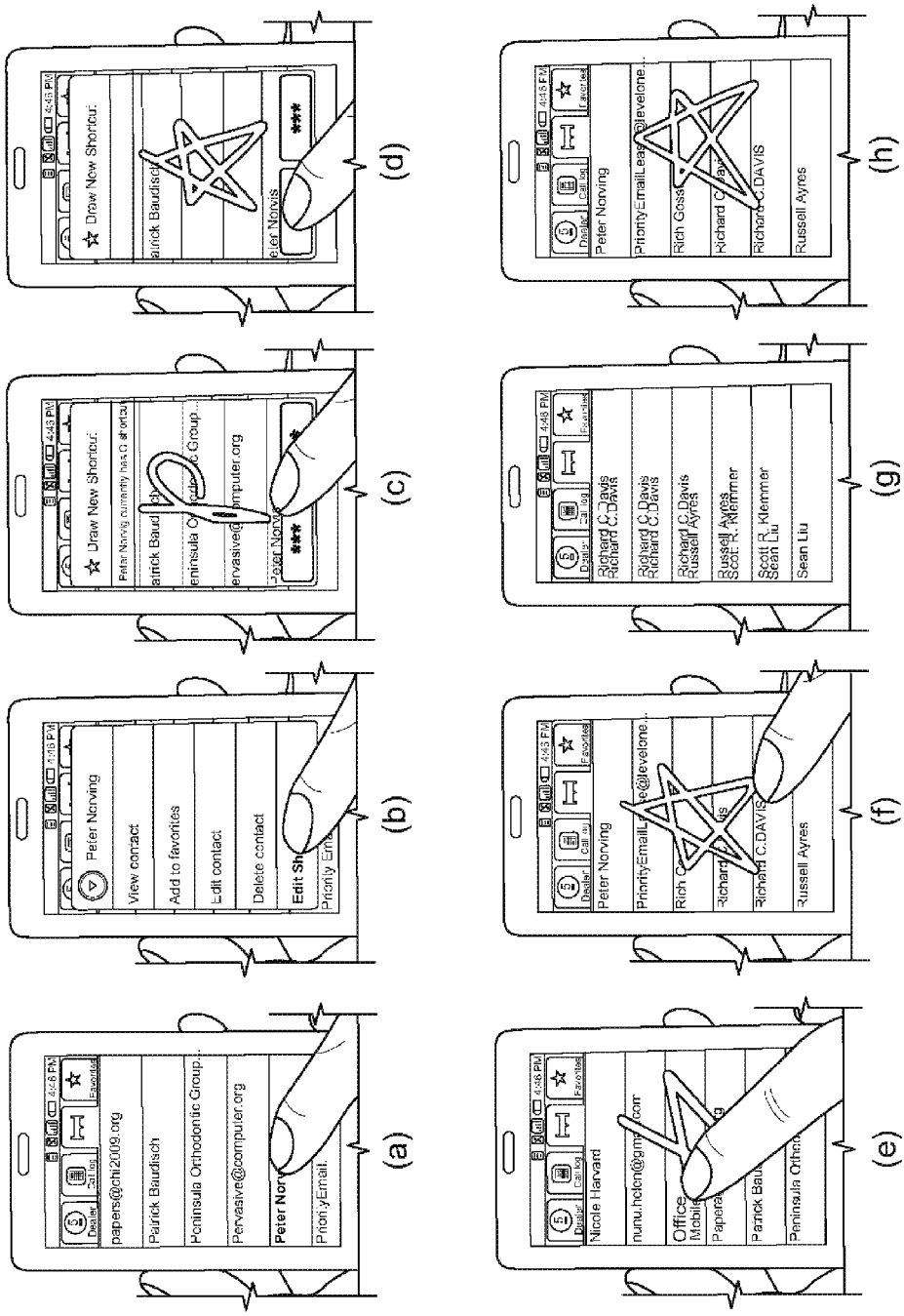
FIG. 2 shows a series of screenshots of a mobile touchscreen device being programmed with custom glyphs.

FIG. 2 shows a series of screenshots of a mobile touchscreen device being programmed with custom glyphs. Generally, the screenshots show mobile device displays in which a user is entering custom, user-defined glyphs for reaching a user interface item in the form of a contact record for someone who is a friend of the user. Again, each of the screenshots occurs chronologically after the prior screen shot.

The first display, designated with the letter (a), shows a user long pressing on a name of a friend in an alphabetical list of the user's contacts. Such a selection brings up the multi-part menu shown in the display designated with the letter (b), where the user is presented with the options of viewing the contact (e.g., seeing a photo of the friend, along with one or more telephone numbers and e-mail addresses), adding the friend to a list of favorites (which is a sub-list of al the objects of this type that a user may have on their device, and that can be presented to the user more conveniently than could a list of all the objects on the device), editing a contact (by showing the contact information to the user and allowing the user to change it), deleting the contact, and editing a shortcut to the contact. In the image, the user is clicking or long clicking on the option to edit a shortcut for the object or item of the friend's contact record.

The selection of that option by the user has led to the display designated with the letter (c), where a partially transparent canvas has been displayed over the menu, along with instructions for the user to draw or trace a glyph whose entry will thereafter be correlated with the contact record for the friend. (In the line drawing of the figure, the canvas is fully transparent, though actually implementations may use various visual effects to allow the user to maintain a sense of place in the system while they are entering a character.) In the display, the user is tracing a letter "P," presumably because the friend's first name begins with the letter "P"—therefore, a natural memory crutch for the user in remembering the appropriate glyph for the friend later.

At the display represented by the letter (d), the user has selected the menu "edit short cut" again for the same friend's contact record, and is in the process of drawing a glyph in the form of a standard 5-pointed star—perhaps because the user knows that the friend has always excelled at all that he has done, and is thus a star performer. The user is also in the process of pressing an "add" button so as to add the star glyph as one of the representations for the friend, in addition to the traced letter "P."

At the display represented by the letter (e), the user has returned to the list of contact where this process started in display (a), and is in the process of tracing the 5-pointed star, and at the display represented by the letter (f), the entry of the star glyph is complete, has been interpreted by the device as matching the glyph entered by the user in display (d). In the display represented by letter (g), the user has flicked the display to induce it to scroll to another letter (where the vertical flick has been distinguished from the entry of a letter or other glyph), and then has caused it to return to the record that represents the friend's contact by re-entering the five-pointed star at the display represented by the letter (h). (The double display of some entries in the figure represents the blurred motion of those entries as fast scrolling occurs.)

In certain circumstances, standard glyphs may be mixed with custom glyphs. Standard glyphs are glyphs that are assigned by a third party such as a software developer, while customized glyphs are drawn by a user of the device himself. Thus, for example, a standard glyph may be used to represent locations in alphanumeric lists like music lists and contact lists, while custom glyphs may be used to represent particular objects that are unique to a user's device. The user may also create multiple glyphs for a particular object, so that, for example, they could assign characters from a non-English alphabet to cause scrolling of lists according to entry of such characters, where the lists would scroll to the location of the equivalent English character in the list.

The standards for identifying standard glyphs may be looser than those for identifying custom glyphs. In particular, standard glyphs are developed to be used by many different people and thus may need to be recognized across a greater level of variation, whereas custom glyphs are draw by a particular user and thus may be assumed to have a greater degree of repeatability. Thus, the prevalence of false positive recognitions may be reduced for custom glyphs by "dialing down" the level of variability allowed for such glyphs.

Figure 3:
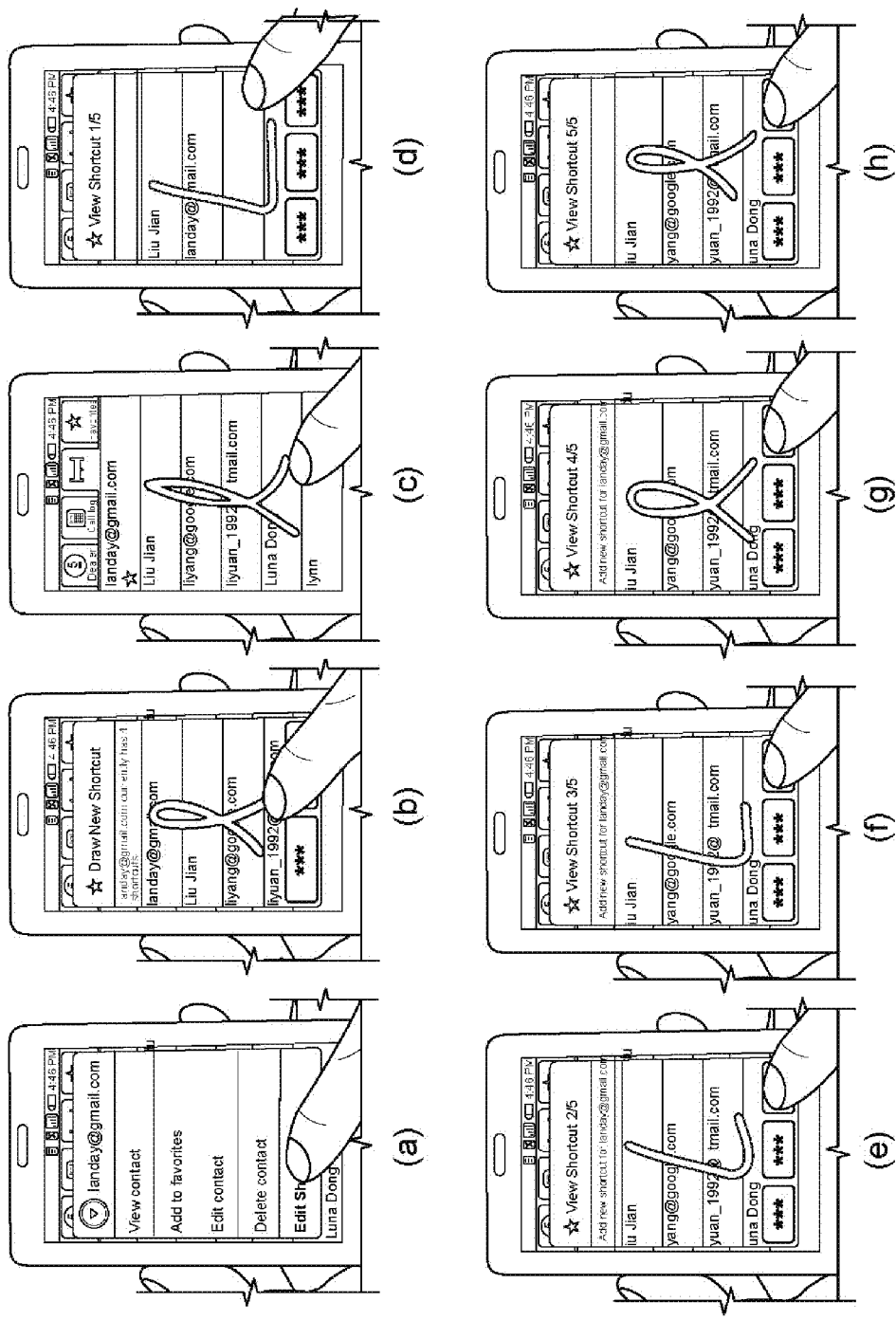
FIG. 3 shows a series of screenshots of a mobile touchscreen device showing multiple glyphs corresponding to an object.

FIG. 3 shows a series of screenshots of a mobile touch-screen device showing multiple glyphs corresponding to an object. In general, these screenshots represent displays that show how multiple different glyphs can be assigned to a single object, including multiple similar glyphs that make it possible to accept a user's inputs with greater variability.

At the display represented by the letter (a), a user is shown selecting a menu control to edit a short cut to an acquaintance's contact record, similar to the selection of letter (b) in FIG. 2. As with letter (c) in FIG. 2, the user is presented, in the display represented by the letter (b) in FIG. 3, with a canvas on which to draw or trace a glyph, which in this case the user traces as a lower case, cursive "l". At the display represented by the letter (c), the user has returned to a list of contacts, and has entered a lower case "l", though with a loop that is thinner than that previously entered by the user for the particular contact record. In such a situation, where the entered glyph does not match, to a sufficient degree, and stored glyph—or at least any stored glyph that is relevant to the present context—the device may indicate to the user that the entry did not register properly. For example, the color of the letter drawn by the user may change from white to red to indicate a failed entry. Alternatively, a sound may be made by the device (such as a Bronx cheer, or Raspberry) or the device may be caused to shake slightly so that the user can hear or feel that something is out of the ordinary.

Upon receiving such a notice, the user in this example has decided to look at the glyphs that they have already correlated to the friend's contact record, and has selected the record (which was already at the top of the display). The displays represented by letters (d) through (h) represent five different glyphs that the user has already assigned to this contact record, with three of the glyphs resembling capital printed "L" letters, and two of the glyphs representing lower-case cursive "l" characters. The different displays can be cycled through by the user by selecting "prior" and "next" controls that are displayed on he touchscreen or in other appropriate manners. The user in this example can see what was wrong with the glyph that he entered in letter (c), and can then add a new glyph or change his future practices to better match the stored glyphs shown in the displays lettered (g) and (h).

Where a glyph is recognized but its meaning is ambiguous, various mechanisms may be employed to resolve the ambiguity. For example, if a user is looking at an alphabetical list, but has also assigned a glyph in the form of a letter to a playlist, to an application, and to a contact record of a friend, the entry will be ambiguous because it could represent any of those objects. In one implementation, one or more rules may be used to infer the intention of the user. For example, because the user is in the context of a list, a device may assume that the user intends to scroll within the list. Alternatively, if the user had been on a desktop, the device may have assumed that the user wanted to launch an application. Various priority rules may be applied in making such determinations, and the rules may be modified and customized by a particular user.

A device may also permit a user to provide follow-up input where the user's initial input was ambiguous. Thus, in the example above, the user may be presented graphically with a list of the objects that correspond to the glyph that the user entered. The user may then select one of the objects from the list such as by pressing on it on the display or by speaking a number corresponding to the position of the object in the displayed list.

In certain implementations, the entry of a glyph may be universal, and in others, it may be contextual. Also, the entry of certain glyphs may be addressed only in certain contexts, whereas the entry of other glyphs is addressed in all contexts. As one example, of the latter situation, a glyph that relates a certain object, such as a contact record, active, may be called up in any context.

Glyphs may also be linked to macros, scripts, or other objects stored on a device. For example, a user may have written a macro or script that changes various settings on their device so as to match their needs when they are at work and then to match different needs when they are away from work—effectively changing a them of the device across a number of different objects. The user may, in such an implementation, cause a glyph to be associated with the macro or script so that when the user enters the glyph, whether on the desktop or from within an application, all of the relevant objects are automatically changed on the device.

Glyphs can also be employed, for example, in relation to user-directed search queries, whether the glyphs are standard characters or are user-defined glyphs. For example, the letter "H" can be drawn by a user to raise a history of recently visited web sites for a device, listed in a reverse chronological list or in other appropriate manner. Likewise, a user can define a persistent search that he or she would like to submit and may assign a glyph to it. For example, a user may want to repeatedly search for news on himself or herself, and could program a glyph in the shape of a star to be interpreted as a search request that contains his or her name and is submitted to a news-related search engine. Entry of the glyph from any context on the device may cause a browser to launch, the search query to be submitted, and the search results to be delivered into the browser.

Figure 4:
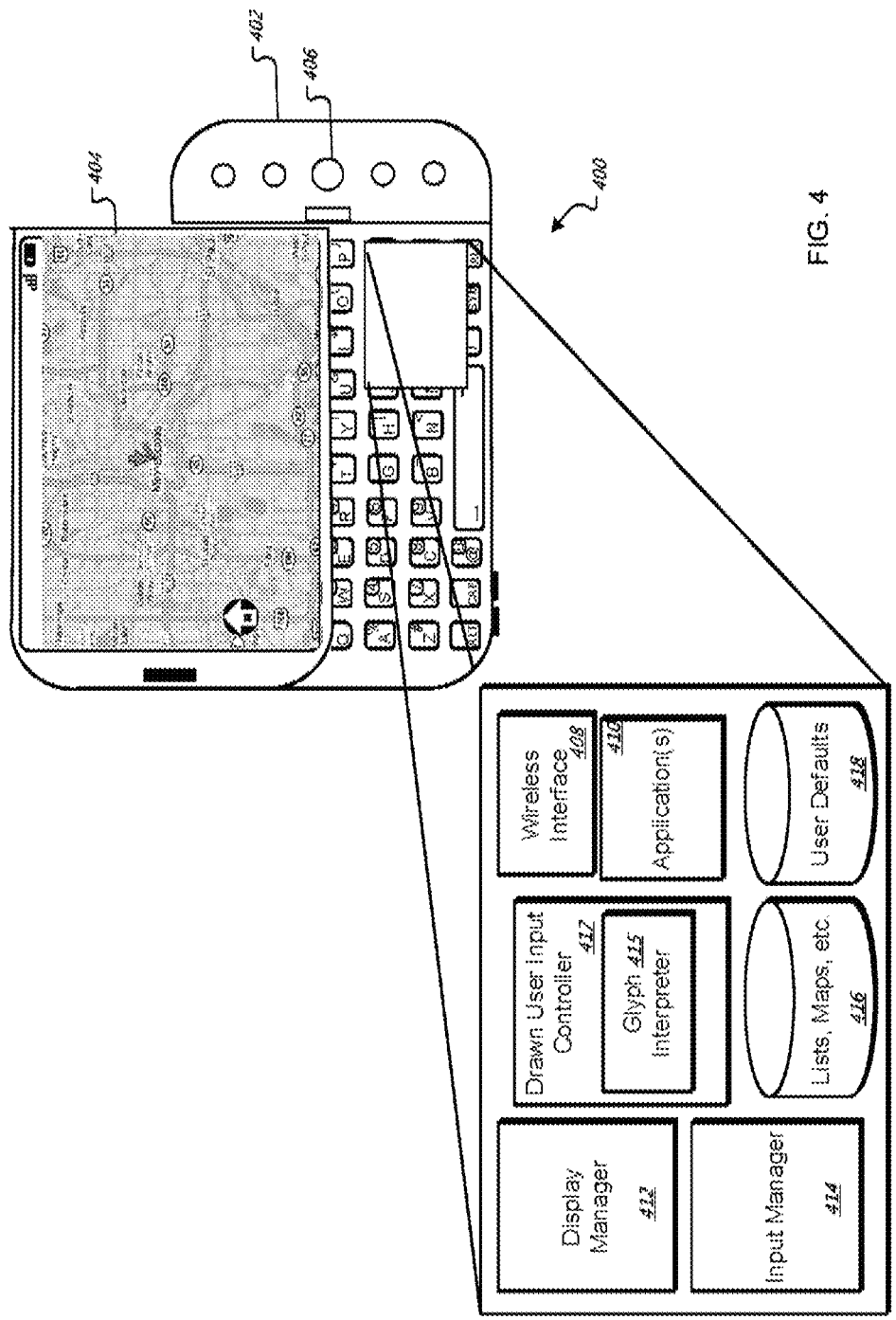
FIG. 4 is a schematic diagram of a system that provides user interaction in response to touch screen inputs.

FIG. 4 is a schematic diagram of a system 400 that provides user interaction in response to touch screen inputs. The system 400 may be implemented using a mobile device such as device 402. The device 402 includes various input and output mechanisms such as a touch screen display 404 and a roller ball 406. A number of components within device 402 may be configured to provide various selection functionality on display 404, such as by the drawing of one or more glyphs on the display 404.

One such component is a display manager 412, which may be responsible for rendering content for presentation on display 404. The display manager 412 may receive graphic-related content from a number of sources and may determine how the content is to be provided to a user. For example, a number of different windows for various applications 410 on the device 404 may need to be displayed, and the display manager 412 may determine which to display, which to hide, and what to display or hide when there is overlap between various graphical objects. Also, when another component of the device 404 recognizes that a user is trying to draw a glyph on a touchscreen display, the display manager may help coordinate the generation of the glyph on the display at the locations where the user has drawn.

The display manager 412 can include various components to provide particular functionality for interacting with displayed components, which may be shared across multiple applications, and may be supplied, for example, by an operating system of device 402. Entry of glyphs over other displayed components may be managed, in coordination by the display manager 412, using a drawn user input controller 417. Such a controller may be responsible for recognizing when a user is entering a glyph rather than performing a different function on the display, and for changing the input glyph into a command that can be interpreted by other components on the device. To produce such commands, the drawn user input controller 417 may refer to a glyph interpreter, by passing to the glyph interpreter 415 information defining the shape of a glyph that was entered by a user. The glyph interpreter 415 may then compare the entered glyph to both standard and custom glyphs that are stored on the device, and return the identity of the glyph, such as a glyph ID number.

The drawn user input controller 417 may have previously mapped and stored the glyph ID's and actions that are to occur when a particular glyph is entered. As a result, the controller 417 may pass such information to other components of the device. For example, various applications 410 may be stored on and run on the device. Where, for example, the controller 417 represents a glyph that has been correlated to a contact record, the controller 417 may call the contact application and pass it the identity of the record so that the record will automatically be displayed in response to a user's entry of the glyph. In this manner, the controller 417 can act as a sort of intervener between core components of the operating system, and with applications on the device.

An input manager 414 may be responsible for translating commands provided by a user of device 402. For example, such commands may come from a keyboard, from touch screen display 404, from trackball 406, or from other such sources, including dedicated buttons or soft buttons (e.g., buttons whose functions may change over time, and whose functions may be displayed on areas of display 404 that are adjacent to the particular buttons). The input manager 414 may determine, for example, in what area of the display commands are being received, and thus in what application being shown on the display the commands are intended for. In addition, it may interpret input motions on the touch screen 404 into a common format and pass those interpreted motions (e.g., short press, long press, flicks, and straight-line drags) to the appropriate application. The input manager 414 may also report such inputs to an event manager (not shown) that in turn reports them to the appropriate modules or applications. The input manager may pass inputs in the area of a soft keyboard to the IME when IME functionality is activated for a device.

The controller 417 may register with the input manager 414 so as to be informed about user inputs on the touchscreen, and may in turn inform the input manager when it has recognized a particular input as being a drawn input, so as to prevent the input manager from passing the input to other components that may interpret it inaccurately as being something else.

A variety of applications 410 may operate, generally on a common microprocessor, on the device 402. The applications 410 may take a variety of forms, such as mapping applications, e-mail and other messaging applications, web browser applications, music and video players, and various applications running within a web browser or running extensions of a web browser. The applications 410 may include applications that stored records or other components having alphanumeric names, and that can thus be accessed quickly by a user drawing of an alphanumeric character on the front of the touchscreen 404.

A wireless interface 408 manages communication with a wireless network, which may be a data network that also carries voice communications. The wireless interface 408 may operate in a familiar manner, such as according to the examples discussed below, and may provide for communication by the device 402 with messaging services such as text messaging, e-mail, and telephone voice mail messaging. In addition, the wireless interface 408 may support downloads and uploads of content and computer code over a wireless network.

Various forms of persistent storage may be provided, such as using fixed disk drives and/or solid state memory devices. Two examples are shown here. First, a lists, maps, etc. storage 416 includes various definitions for objects that may be stored on and presented by the device 402. Such objects include lists of other objects, such as lists of songs, television shows, movies, or other media on the device. The lists may also include lists of file names where the device 402 stores a large number of files. Also, other objects such as maps may be stored (e.g., as graphical map tiles that can be pre-fetched from a remote server), and meta data about the maps, such as the names of towns and streets on a map, along with the names of points of interest and business on the maps.

Other storage includes user defaults 418, which may be profile information for a user stored on the same media as the lists, maps, etc. 416. The user defaults 418 include various parameters about a user of the device 402. In the example relevant here, the user profile may include data defining various custom glyphs that the user has entered, along with objects or actions to be associated with the entry of those glyphs. Glyph data and other information may be stored in a variety of forms, such as in one or more XML files or in Sqlite files.

Using the pictured components, and others that are omitted here for clarity, the device 402 may provide particular actions in response to user inputs. Specifically, the device 402 may respond to inputs by a user by recognizing an input as being a glyph shortcut, and for responding to such data entry by jumping a device to a location or object associated with the glyph.

Figure 5A:
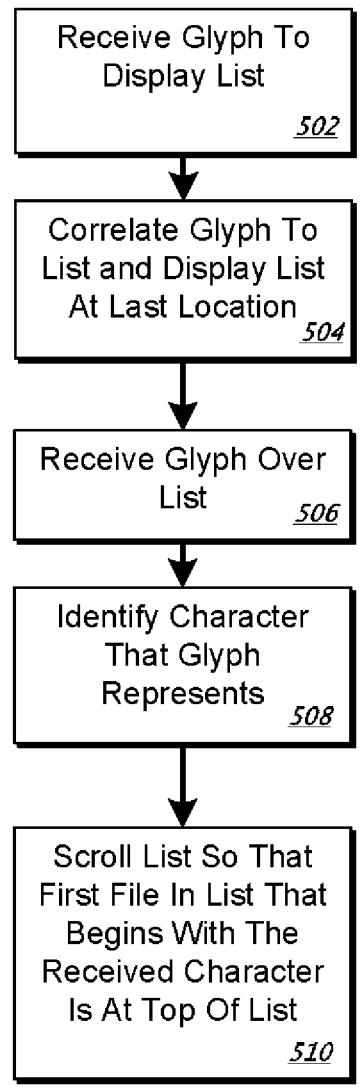
FIGS. 5A-5D are flow charts of example processes for handling glyph entry by a user of a computing device.

FIGS. 5A-5D are flow charts of example processes for handling glyph entry by a user of a computing device. FIG. 5A generally shows a process by which an alphanumeric glyph entered by a user on top of a list that is displayed on a device may cause the device to jump automatically to a new location in the list.

The process begins at box 502, where a glyph is received. The glyph may be of a form that was previously programmed by a user to indicate that the user wants to display a list, such as a list of contacts, a list of songs, of another type of list. For example, the user may have programmed the shape of a treble clef into their device to represent an intent to have a list of songs on their mobile device displayed. The list is generally sorted in an alphanumeric manner, for example with titles that began with a numeral near the top of the list and titles that begin with the letter Z near the bottom. The glyph may be entered in the form of a character that is defined by a contact point, a release point, and a drawn path between the contact point and the release point.

At box 504, the glyph is correlated to the list (e.g., by finding a closest match to the glyph in a library of stored glyphs and then determining that the matching stored glyph is assigned an action of raising a song list), and the list is displayed at its last location. For example, if the list had previously been active and a user had started using another application, the list may be displayed in the state that it was in when the user last viewed it. In this example, the user wants to jump to a different location in the list, so at box 506, the user draws a glyph of a letter of the alphabet over the list, such as in a manner shown in FIG. 1—where the letter represents the location in the list where the user wants to jump.

At box 508, the process first determines that the user intends to enter a glyph, and then identifies an alphanumeric character that corresponds to the glyph entered by the user. For example, the process may determine that the user has attempted to enter a particular letter of the alphabet. Thus, at box 510, the process scrolls the list so that the first file in the list begins with the character that the user entered. For example, if a user entered the letter B, the list may be scrolled so that a song list for the user is shown, where the top of the display starts with the title Badlands, followed by The Ballad of John and Yoko, followed by Bang, Bang, Bang, Bang (John Lee Hooker), etc.

In this manner, a user may be allowed to jump quickly to a well-defined location in a list of items without having to scroll for a long time up and down the list. As a result, the user may reach a desired location more quickly and more reliably than if they were required to scroll. Also, a user may be able to trace a glyph without having to look at their device so that they can control their device without losing concentration on other things that they are doing.

Figure 5B:
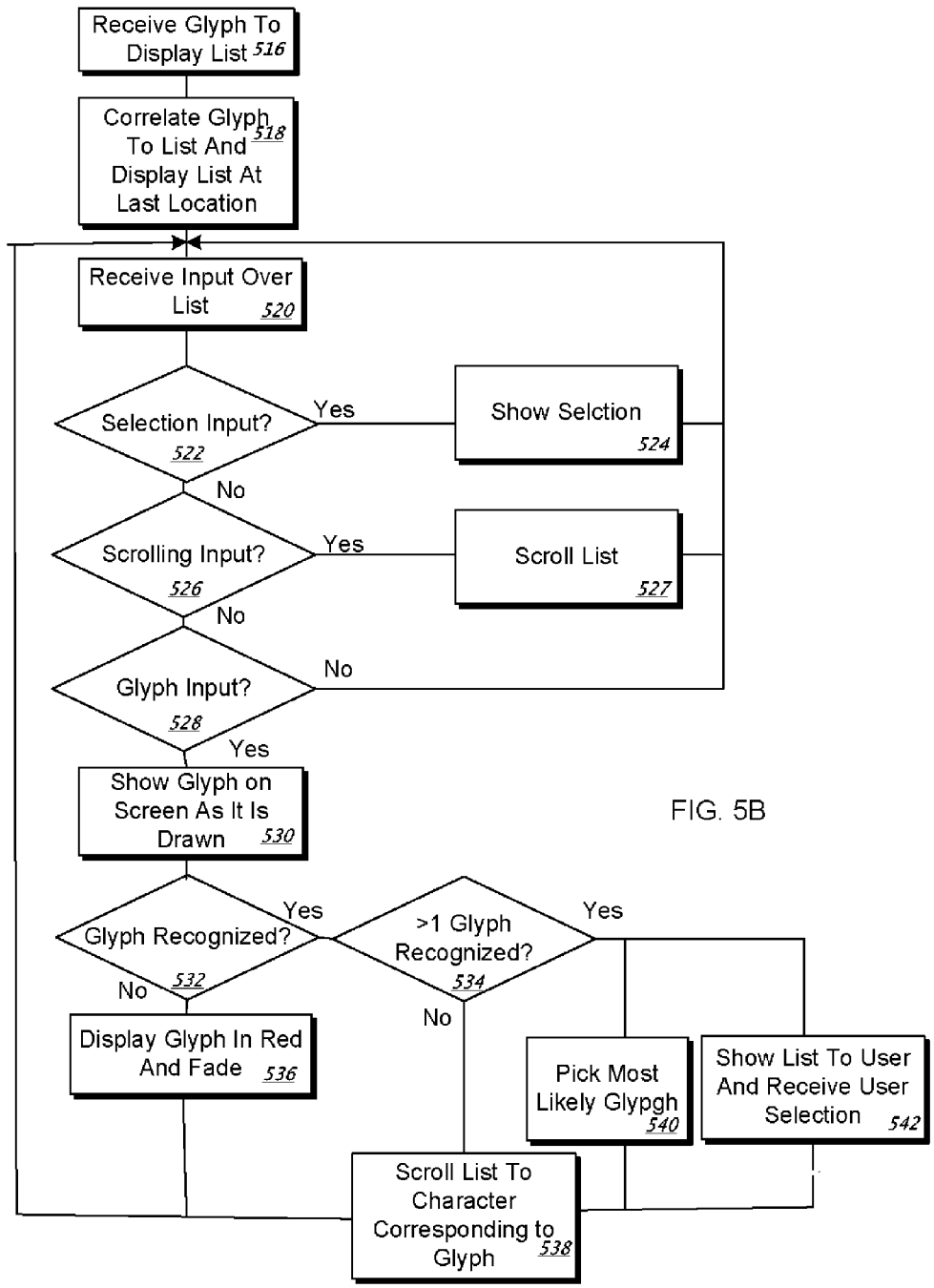

FIG. 5B generally represents a process that is similar to the process in FIG. 5A, but shows additional detail by which a device may operate in allowing a user to jump to a new location in a list. The process begins at box 516, were a user enters a glyph to show the user's intend to have a list of a particular type displayed. At box 518, the process correlates the entered glyph to the particular list and causes the list to be displayed at its last location in the list. At box 520, the process receives a user's input over the list, such as by the user pressing a finger to a touchscreen display that is showing the list, and by the user tracing out a path on the display.

At box 522, the process determines whether the user input was a selection input. For example, a user tapping on an object on a display may indicate a user intent to select that object, such as by selecting a name in a list of names to have a contact record for the selected name displayed on the device. If the input is a selection import, the process may show the selection box 524 and then may continue waiting for additional inputs from the user.

At box 526, the process determines whether the input is in the form of a scrolling input, such as if the input is a quick vertical swipe by the user on the display screen. If the input is in the form of a scrolling input, the process scrolls the list to a new location as shown at box 527, and then returns to receive additional user input.

At box 528, if the input is not a scrolling input and is not a selection input, the process determines whether the input was a glyph input. Such a determination may be made, for example, by identifying a bounding box of an initial entered line by the user, and determining if the aspect ratio of the bounding box indicates a user intent to enter a character such as a glyph. If the input is not a glyph input, the process may again return to receive additional user input. Such an input that does not match any of the recognized inputs may include, for example, a selection that is made on a display area where there are no selectable objects.

At box 530, the glyph is shown on the screen as it is drawn. For example, a line or polyline may appear at a location below a line on the screen where the user has pressed and dragged their finger. In this manner, the user is provided feedback to indicate that the device is recognizing their import in a proper manner, so that the user may continue providing the input.

At box 532, the process determines whether any glyph has been recognized by the user input. For example, the process may use various mechanisms to compare the shape drawn for the glyph with stored shapes that represent known glyphs, such as alphanumeric characters. If no glyph is recognized, the process displays the glyph in red and fades the glyph away at box 536, so that it is no longer being shown to the user. In this manner, the process indicates to the user that recognition of the glyph has failed and that the user should attempt to enter other glyphs or perform other actions. The process then returns back to waiting for additional user input.

If a glyph is recognized, the process determines whether the input is ambiguous or not at box 534, where it determines whether multiple glyphs have been recognized. If only one glyph has been recognized, the process may immediately scroll the list to a character that is associated with the entered glyph at box 538. If multiple glyphs could match the glyph that was entered by the user, the process may disambiguate the entry in one of multiple ways. In this example, two different ways of disambiguating the entry are shown. First, the process may, at box 540, pick the most likely glyphs that the user intended to enter out of the possible candidate glyphs. For example, as explained above, a number of rules may be used to determine a most important glyph or most likely glyph. For example, if a user is in a particular application, the glyph associated specifically with that application may be favored over a more general glyph, such as a glyph that would cause the user to jump to an object in a different application. Alternatively, at box 542 a list of possible actions may be shown to the user, and the user may select the action that they intended to invoke when they entered the glyph. In either situation, the process again scrolls the list to the character that is determined to be the character that the user intended, and the process returns to receive additional input from the user.

Figure 5C:
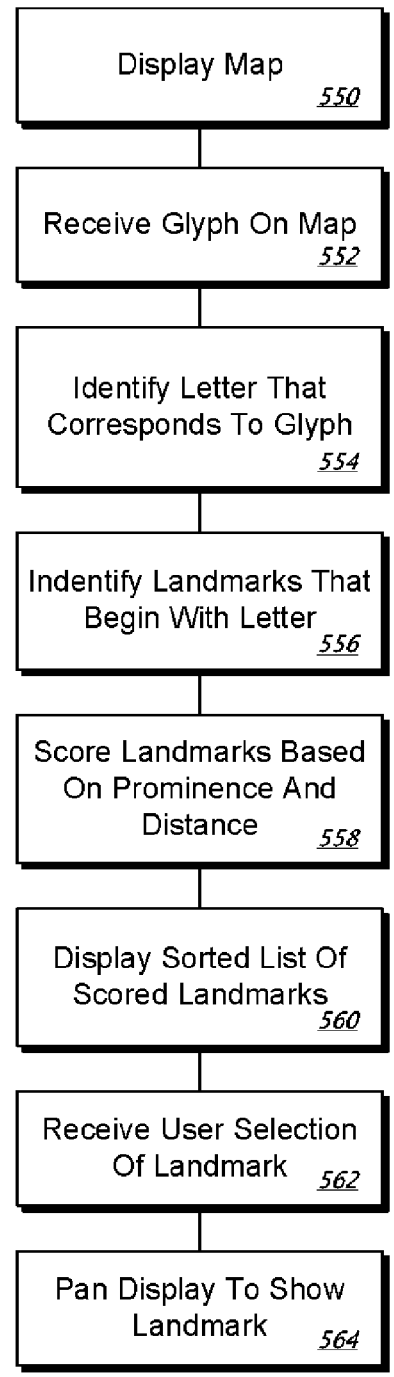

FIG. 5C shows a flowchart of a method for navigating on a geographical map using glyph entry. In general, the process involves receiving a glyph in the form of an alphanumeric character or other entry that indicates a user interest in a point that may not currently be represented on the map, and automatic panning of the map to a point of interest that corresponds to the alphabetic or numeric character or other entry.

The process begins at box 550, where a computing device displays a map to a user. The map may be made up of a number of tiles, such as in the manner provided by GOOGLE MAPS. At box 552, the device receives the entry of a glyph by a user on the surface of the map. The glyph may be distinguished from other entries such as selections, or panning or zooming motions on the map, using mechanisms like those discussed above.

At box 554, the process identifies a letter or number that corresponds to the entered glyph. In addition, the process could identify a shortcut that a user has associated with the glyph. At box 556, the process identifies landmarks that began with the letter that is associated with the glyph. The landmarks may be identified in a variety of different manners. For instance, when tiles for a map are downloaded to a device from a central server, additional metadata for the map may be provided with the download. For example, names of streets, landmarks, buildings, businesses, rivers, intersections, districts, sporting venues, festivals, and other such objects may be provided to the device along with geolocation information for such items. Such metadata may be used in normal use of the device, when a user enters a query on the device. As shown in the process here, however, the metadata may be matched to the letter of the glyph that was entered by the user. Thus, for example, if a user were driving through an area of town looking for Main Street, the user may enter and an "M" shape on their screen to have Main Street located for them on a map they were displaying. In this manner, the user may quickly identify landmarks or other items in their vicinity that start with a particular letter.

In many instances, multiple landmarks in the vicinity of a user will start with the same letter. Thus, the entry of a letter by a user in the formal glyph may be ambiguous to a device. As discussed above for lists, a particular landmark may be selected and displayed to the user by employing various selection rules. Alternatively, all the landmarks in an area may be presented to the user in a list, for selection by the user. For example, where a user enters an "M" shape on their device, as described above, there may also be a number of McDowell's restaurants in the area that are signified by their Golden Arcs, and those restaurants may also trigger a match. In a like manner, Maple Street, Marple Avenue, and the Metrodome could be identified as matches.

In situations where multiple matches occur for a letter entered by the user, box 558 shows that those landmarks may be scored based on their prominence and distance to the user. For example, a scoring algorithm may be programmed so that street names take prominence over business names when a user is moving at a relatively high speed, such as in their automobile, but business names take precedence over street names when a user is moving more slowly so as to indicate that they are walking and perhaps looking for a particular store. In a like manner, landmarks that are close to a user may take precedence over landmarks that are farther away. Thus, in various manners, the process may produce a composite score for each landmark that matches a letter entered by a user, and the various matching landmarks may then be displayed to the user in a list that is sorted according to the scores (in decreasing order), as shown at box 560.

At box 562, the process receives a user selection of a particular landmark, and at box 564, the process pans the display of the map so that the selected landmark is showing on the display. Where the landmark cannot be displayed on a single display, such as when the landmark is a long street, a particular position along the landmark may be determined, such as by determining a future intersection of the user with that landmark if the user is to continue in the direction that he or she is currently moving. Also, certain landmarks may result in the zoom level of the map changing after the user has selected the landmark (e.g., very large landmarks).

Figure 5D:
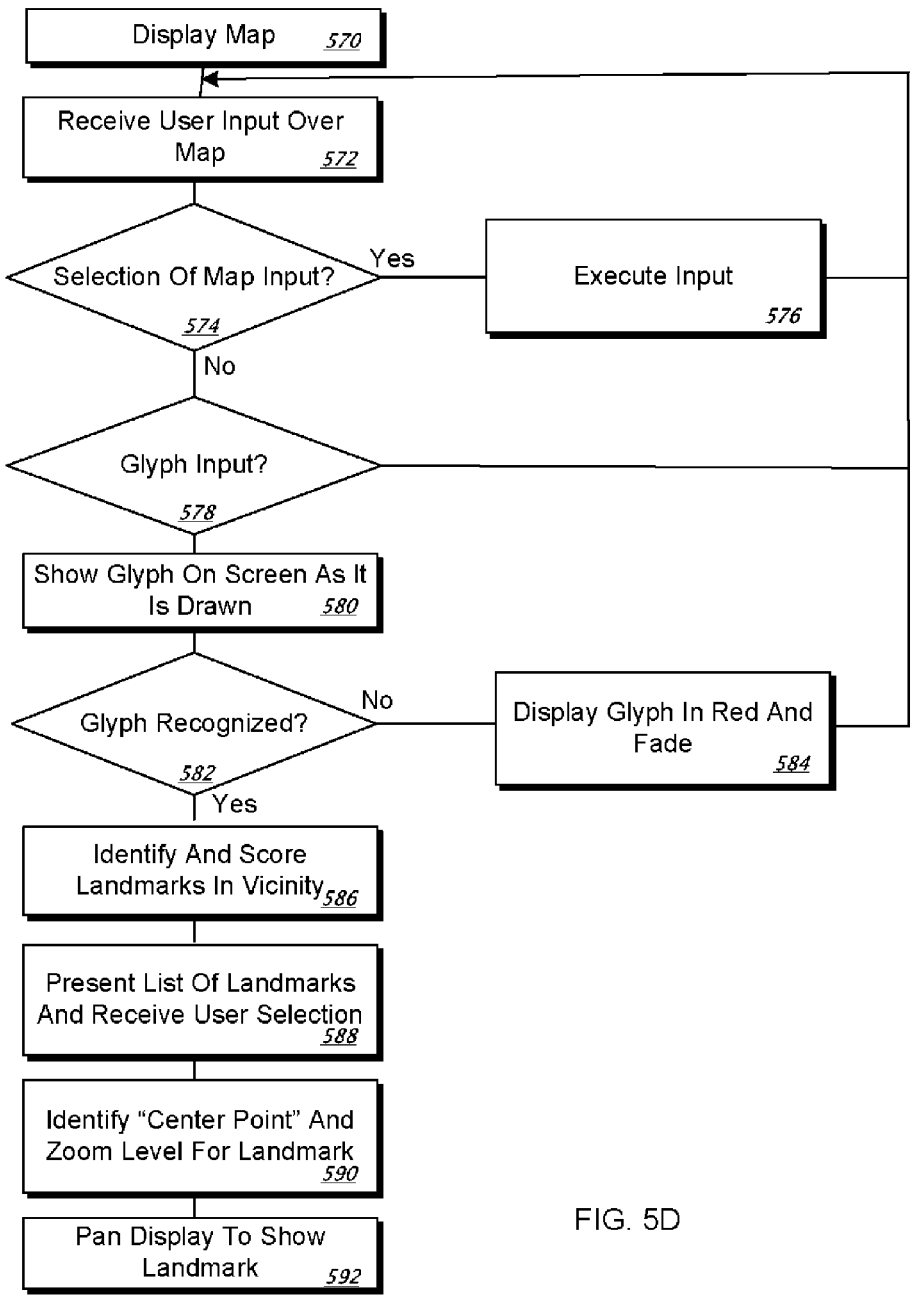

FIG. 5D shows a process for moving on a map in response to a user input of a glyph over the map, and is similar to the process shown in FIG. 5C but is shown with greater detail. The process begins at box 570, where a map is displayed in a familiar manner. At box 572, a user input is received over the map. At box 574, the process determines whether the user input is a selection input, and if it is, the input is executed at box 576. At box 578, the input is analyzed to determine whether it is a glyph input, and if it is not, the process returns to waiting to receive additional user input. If the input is glyph import, the glyph is displayed on the screen as it is drawn by the user at box 580. In this manner, the process provides feedback to the user so that they can see that their input is being properly processed by the device.

At box 582, the glyph has been drawn (e.g., the user has lifted his or her finger), and the process determines whether it can recognize the glyph that the user entered. If the process cannot recognize the glyph as relating to a stored glyph in a device, the process displays the glyph in red and fades the glyph away at box 584, returning the user to enter additional import. For example, the user may then attempt to re-enter the glyph in an effort to get the device to recognize it a second time.

If the glyph is recognized, then the process identifies and scores of landmarks in the vicinity of the user (which may be determined as an actual location, e.g., using a GPS receiver, or as an inferred location, e.g., by assuming that the user is at the center of a map that the is currently being displayed to the user) that begin with an alphanumeric character that correlates to the glyph. The process then presents a list of landmarks that begin with the letter or number of the glyph, and receives a user selection of one of the landmarks at box 588. At box 590, the process identifies a center point and zoom level for the landmark, such as in a manner as discussed above, and at 592, the process ends by panning the mapping display to a new location so that the landmark is presented to the user in a new location.

Figure 6A:
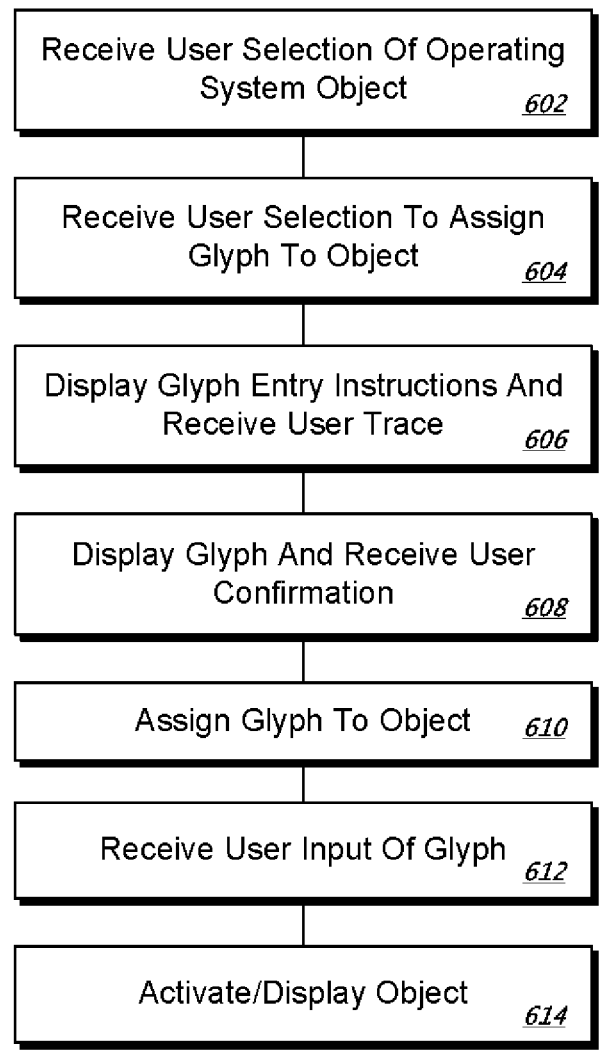
FIGS. 6A-6B are flow charts of example process for associating glyphs with certain computing objects
Figure 6B:
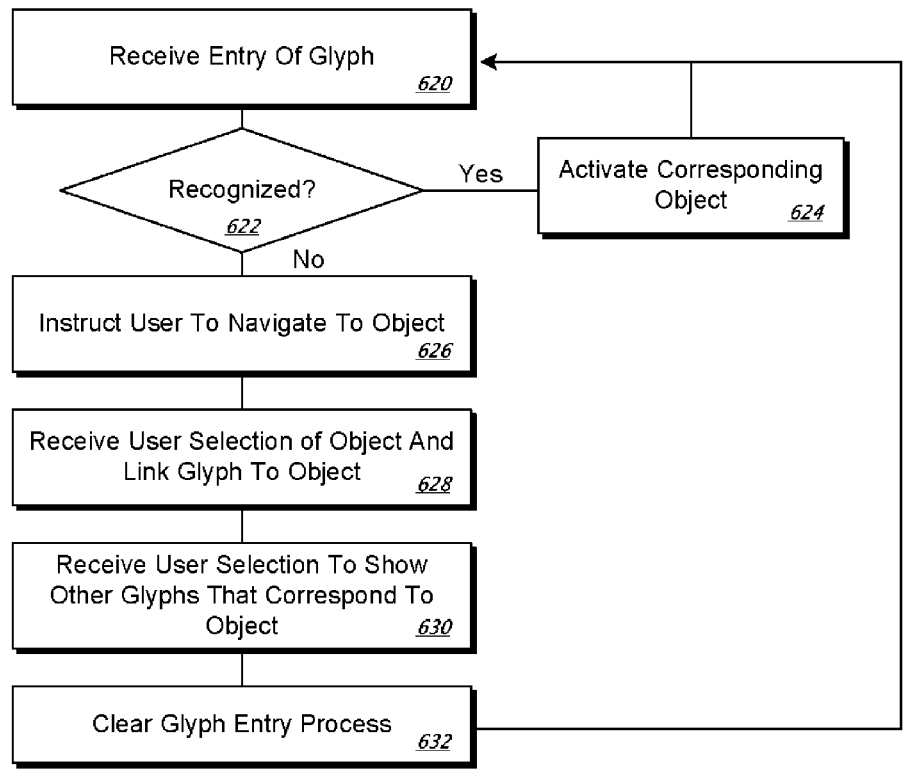

In general, FIG. 6A shows a process for assigning one or more glyphs to a particular object, while FIG. 6B shows a process for displaying glyphs that may be associated with an object. The process of FIG. 6A begins at box 602, where a user selection of an operating system object is received. Such a selection may occur in many different types of instances, such as when a user wants to review detail about the object or launch an application associated with the object. For example, a user who wants to call a friend will frequently identify a contact record for the friend in a list of contacts, for the purpose of launching a telephony application to call the friend.

At box 604, the process receives a user selection that shows a user intent to assign a glyph to the object. For example, the user may have become more friendly with a particular acquaintance recently and may want to be able to contact that acquaintance more quickly than they have been able to in the past. As a result, the user may want to assign a glyph to that friend so that the contact record for the friend may be brought up more quickly. At box 606, glyph entry instructions are displayed to the user and the user traces a new glyph for the acquaintance in response to the instructions. The tracing path of the user may be displayed as a polyline in a color that contrasts with a background of the device, so that the user can track his or her progress in drawing the glyph. At box 608, the user has finished drawing the glyph, the process displays the glyph to the user, and the process receives confirmation from the user that they would like to have the glyph that they drew assigned to that acquaintance. If the user does not think they drew the glyph properly, they may decline to correlate the glyph to the acquaintance's contact record, and may be shown a canvas again where they can try to draw the glyph a second time. Once the user has indicated an intent to correlate the glyph to the object, the process may assign the glyph to the object at box 610.

At a later point in time, the user may be using their device and may want to bring up the object and immediately, without having to open a list, scroll through the list, and select the object from the list. As a result, the user may then input the glyph into their device, at box 612, and the device and process may, at box 614, interpret the entry of the glyph as a user intent to see the object, and may open the object automatically for the user to review.

FIG. 6B generally shows a process by which a user can sign a glyph to an object by drawing the glyph and then selecting the object. In the particular process shown here, the user initially draws a glyph that is not recognized by their mobile device, so they find the object so that it can be correlated to the glyph and may be brought up automatically the next time the glyph is entered.

The process of FIG. 6B starts at box 620, where the process receives a user entry of a glyph. At box 622, the process determines whether the glyph is recognized as being one of a plurality of stored glyphs that a user may enter on the device. If it is recognized, the object corresponding to the glyph is activated at 624, and the process returns to waiting for additional user entry. If the glyph is not recognized, then the process may instruct the user to navigate to an object at 626, under the assumption that the user intended to enter a glyph for an object but failed to properly enter a glyph that is currently assigned to an object. At box 628, the user has navigated to the object, and the process may thus link to the glyph that the user drew for the object.

At box 630, the user may determine that they would like to see other glyphs that are associated with the same object and they make a selection of a control in that respect. The process may respond by showing the user the other glyphs in a manner such as that shown in FIG. 3. At box 632, the user indicates an intent to stop reviewing glyphs, and the process clears the glyph entry process at box 632. The process then returns to the point where it started and a user may continue to interact with their device in a previous manner.

Figure 7:
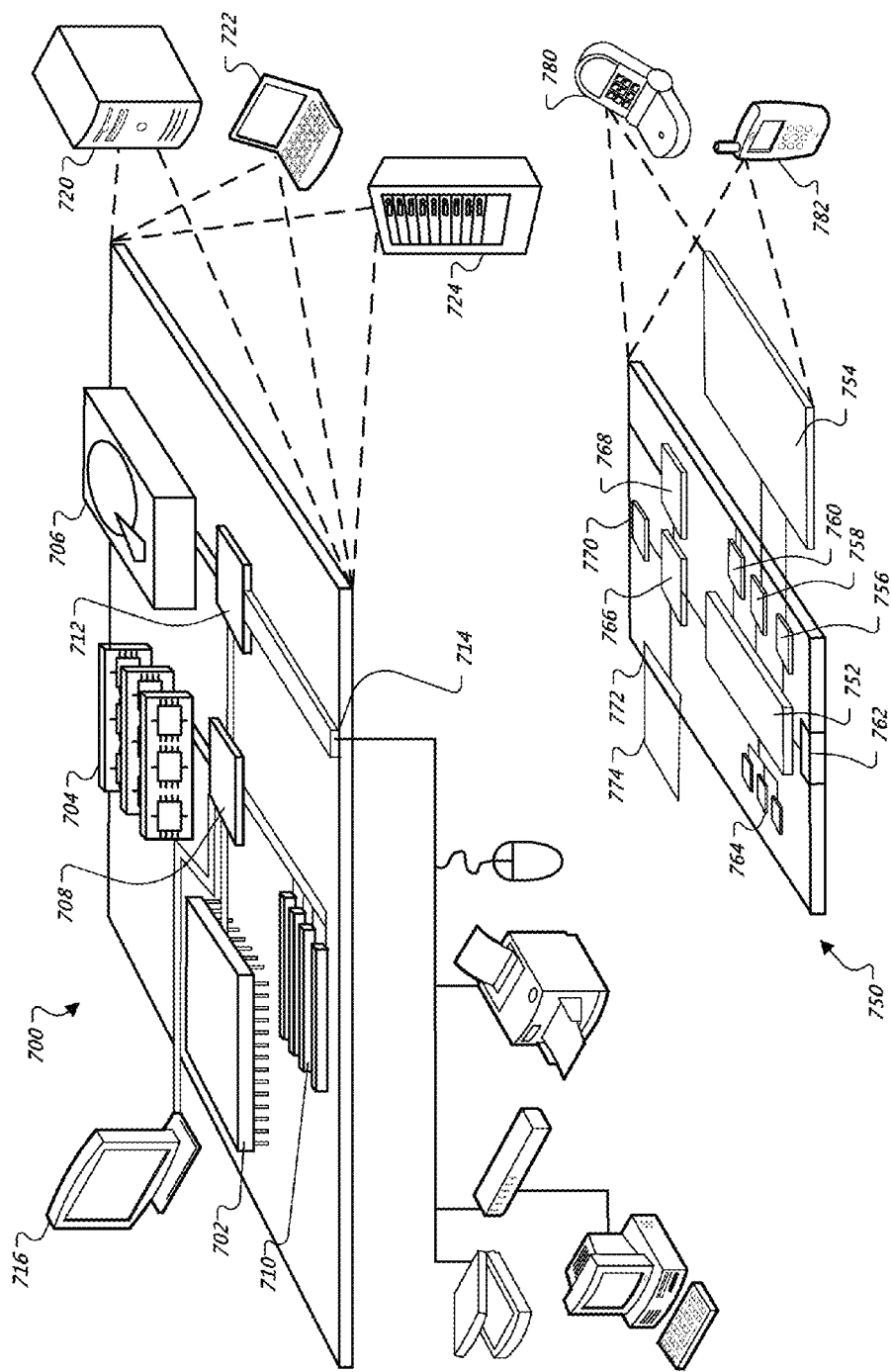
FIG. 7 shows an example of a computer device and a mobile computer device that can be used to implement the techniques described here.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Device 750 may also include one or more different devices that are capable of sensing motion. Examples include, but are not limited to, accelerometers and compasses. Accelerometers and compasses, or other devices that are capable of detecting motion or position are available from any number of vendors and can sense motion in a variety of ways. For example, accelerometers can detect changes in acceleration while compasses can detect changes in orientation respective to the magnetic North or South Pole. These changes in motion can be detected by the device 750 and used to update the display of the respective devices 750 according to processes and techniques described herein.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to messaging and mapping applications, but other forms of graphical applications may also be addressed, such as interactive program guides, web page navigation and zooming, and other such applications.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented user interface method, comprising:
    displaying, within a region of a touchscreen of a computing device, a first sub-portion of a list of items;
    receiving, from a user of the computing device, a drawn input within the region of the touchscreen, wherein at least some of the drawn input is received while the first sub-portion of the list of items is displayed within the region of the touchscreen;
    determining whether the drawn input comprises a scrolling input for the list of items or an entry of a glyph;
    determining that the drawn input corresponds to a particular glyph assigned to a particular item in the list of items; and
    in response to determining that the drawn input corresponds to the particular glyph, automatically displaying, within the region of the touchscreen, a second sub-portion of the list comprising the particular item to which the particular glyph is assigned.

2. The method of claim 1, wherein receiving the drawn input on the touchscreen comprises receiving the drawn input on top of the sub-portion of the list of items.

3. The method of claim 1, further comprising providing to the user a visual or audible failure indicator if the drawn input is not recognized.

4. The method of claim 3, wherein the failure indicator comprises displaying the drawn input in a color that contrasts with a color in which the drawn input was previously displayed.

5. The method of claim 1, wherein the drawn input is defined by a pointer contact with the touchscreen followed by a pointer release from the touchscreen, and a pointer path traced on the touchscreen between the pointer contact and the pointer release.

6. The method of claim 1, wherein determining whether the user-drawn glyph comprises a scrolling input or an entry of a glyph comprises identifying a bounding box for an entry of a portion of the user-drawn glyph.

7. The method of claim 1, wherein one or more items in the second sub-portion was correlated to the glyph by a user of the computing device.

8. The method of claim 7, wherein the one or more items in the second sub-portion was correlated to the glyph by the user drawing the glyph and sending a confirmation to assign the glyph to the one or more items.

9. The method of claim 7, wherein the one or more items in the second sub-portion was correlated to the glyph by the user drawing the glyph and selecting the one or more items to link to the glyph.

10. The method of claim 1, wherein one or more items in the second sub-portion was correlated to the glyph by a third party software developer.

11. An article tangibly embodied in a non-transitory computer-readable data storage medium storing program code operable to cause one or more machines to perform operations, the operations comprising:
    displaying, within a region of a touchscreen of a computing device, a first sub-portion of a list of items;
    receiving, from a user of the computing device, a drawn input within the region of the touchscreen, wherein at least some of the drawn input is received while the first sub-portion of the list of items is displayed within the region of the touchscreen;
    determining whether the drawn input comprises a scrolling input for the list of items or an entry of a glyph;
    determining that the drawn input corresponds to a particular glyph assigned to a particular item in the list of items; and
    in response to determining that the drawn input corresponds to the particular glyph, automatically displaying, within the region of the touchscreen, a second sub-portion of the list comprising the particular item to which the particular glyph is assigned.

12. The article of claim 11, wherein the drawn input is defined by a pointer contact with the touchscreen followed by a pointer release from the touchscreen, and a pointer path traced on the touchscreen between the pointer contact and the pointer release.

13. The article of claim 11, wherein determining whether the user-drawn glyph comprises a scrolling input or an entry of a glyph comprises identifying a bounding box for an entry of a portion of the user-drawn glyph.

14. A computer-implemented user interface system, comprising:
- a graphical display and one or more associated processors and stored instructions configured to:
  - display content, including content associated with characters or symbols, within a region of the graphical display across an area on which varying visible graphics are capable of being displayed, and
  - receive a user-drawn glyph within the region of the graphical display;
- a glyph interpreter programmed to:
  - receive the user-drawn glyph,
  - determine whether the user-drawn glyph comprises a scrolling input or an entry of a glyph, and
  - determine that the drawn input corresponds to a particular glyph assigned to a particular item in the list of items; and
- a drawn user input controller programmed to display on the graphical display, in response to determining that the drawn input corresponds to the particular glyph, within the region of the graphical display, a sub-portion of the list comprising the particular item to which the particular glyph is assigned.

15. The system of claim 14, wherein the sub-portion comprises one or more entries in the list, wherein the one or more entries begin a letter that corresponds with the particular glyph.

16. The system of claim 14, wherein the drawn user input controller is further programmed to receive a drawn glyph from a user and to cause a correlation to be formed between the drawn glyph and an object identified by the user so that future user entry of the drawn glyph causes the object identified by the user to be addressed by the system.

17. The system of claim 14, wherein the drawn user input controller is programmed to identify drawn input that is received over an active application, without a visible input area, on the graphical display.

18. The system of claim 14, wherein determining whether the user-drawn glyph comprises a scrolling input or an entry of a glyph comprises identifying a bounding box for an entry of a portion of the glyph.

19. A computer-implemented user interface system, comprising:
- a graphical display and one or more associated processors and stored instructions configured to:
  - display content, including content associated with characters or symbols, within a region of the graphical display across an area on which varying visible graphics are capable of being displayed, and
  - receive a user-drawn glyph within the region of the graphical display;
- a glyph interpreter programmed to:
  - receive the user-drawn glyph,
  - determine whether the user-drawn glyph comprises a scrolling input or an entry of a glyph, and
  - determine that the drawn input corresponds to a particular glyph assigned to a particular item in the list of items; and
- means for displaying, in response to determining that the drawn input corresponds to the particular glyph, within the region of the graphical display a sub-portion of the list comprising the particular item to which the particular glyph is assigned.

20. The system of claim 19, wherein determining whether the user-drawn glyph comprises a scrolling input or an entry of a glyph comprises identifying a bounding box for an entry of a portion of the glyph.

\* \* \* \* \*